Patented May 5, 1931

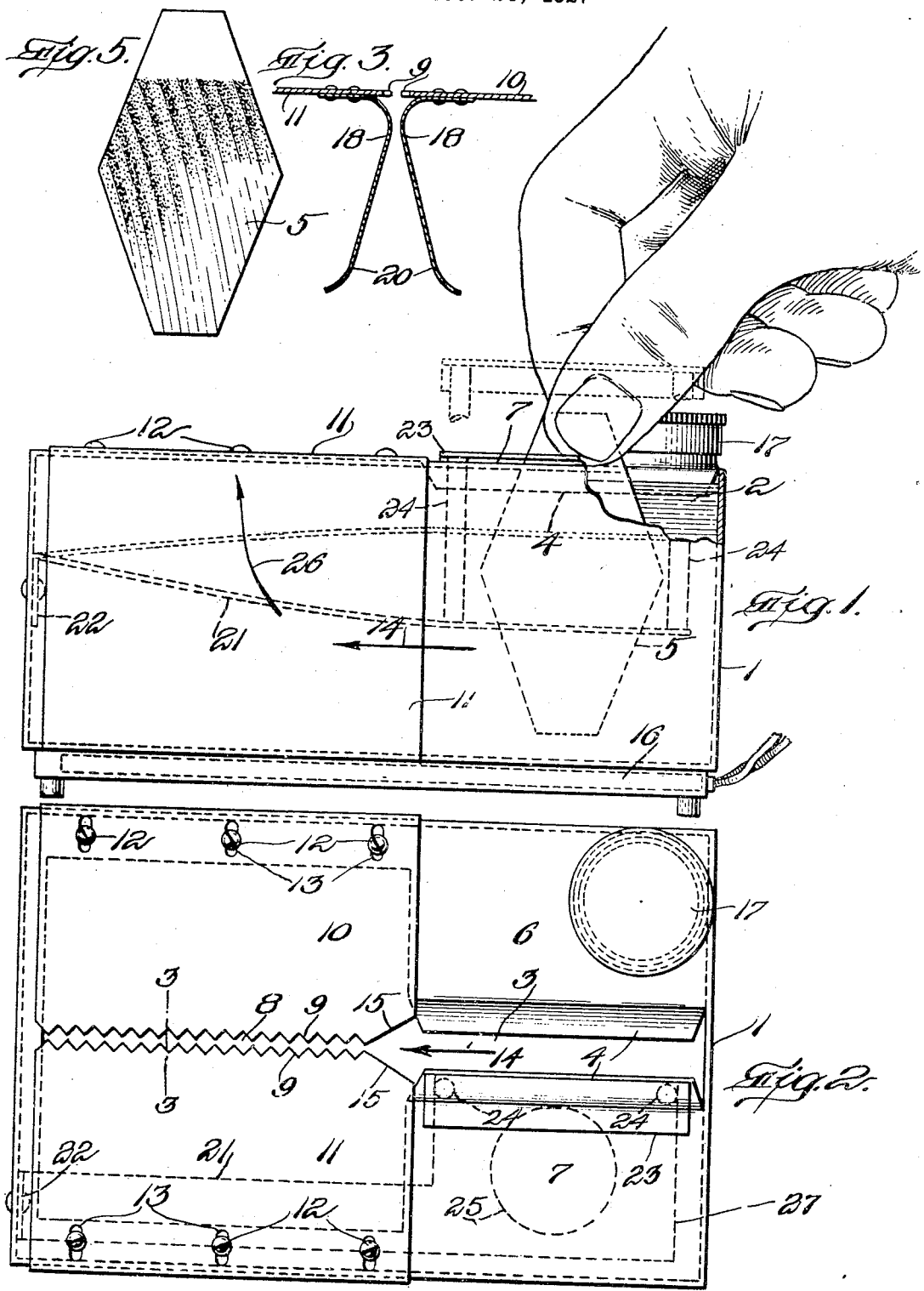

1,803,951

UNITED STATES PATENT OFFICE

ANDREW THOMA, OF CAMBRIDGE, MASSACHUSETTS, ASSIGNOR TO NORTH AMERICAN CHEMICAL COMPANY, OF BOSTON, MASSACHUSETTS, A CORPORATION OF MASSACHUSETTS

SHOE FILLER COATING APPARATUS

Application filed October 24, 1927. Serial No. 228,235.

The present apparatus is for use in shoe factories for applying cut out filler pieces quickly and economically to shoe-bottoms and is especially adapted to the filling of McKay shoes with cut out filler pieces. It will be understood that it is equally adapted to the application of cut out filler pieces to welt shoes. Such died out pieces are disclosed and claimed in my copending applications Ser. No. 133,506 filed September 3, 1926, Ser. No. 183,302 filed April 13, 1927, and Ser. No. 192,076 filed May 17, 1927, and also in my concurrently filed applications Ser. No. 228,236 and Serial No. 228,588.

The present apparatus is intended to facilitate the carrying out of the process or method of filling shoes set forth in my copending application Ser. No. 228,588. In said process I employ a filler piece of sheet-like form and pre-determined shape which may have or may not have a plastic composition in whole or in part, laminated or otherwise, and may or may not include internal or external adhesive. This filler piece of whatever construction, composition or shape is quickly dipped into cement or other fluid capable of developing a cementitious and softened condition in the filler piece and is then drawn or otherwise moved between comb-like edges or other means for forming ridges or heaps and indentations along the surface of the filler piece. Preferably the cementitious material is of a thick, pasty or shoe filler-like consistency and substance so that the exterior of the died out piece is thereby coated all around and ribbed on its opposite sides with this filler material by being passed through the apparatus, and the latter preferably contains means for condensing said layer thereon. The present application is for the said apparatus.

In the drawings,

Fig. 1 is a view in side elevation of said apparatus;

Fig. 2 is a top plan view thereof;

Fig. 3 is a cross sectional detail on the line 3—3 Fig. 2;

Fig. 4 is a right-hand end view of a detail of Fig. 2;

Fig. 5 shows in plan view the filler piece after treatment.

A suitable container 1 herein shown, and preferably, rectangular in shape adapted to hold the fluid 2, preferably filler material above explained and provided with a central opening 3 whose adjacent side edges 4 are preferably bevelled to facilitate the insertion of the filler piece 5. At least the top portions 6, 7 of this container 1 are preferably formed of fibre board or other non-conductor of heat for the protection and convenience of the operator's fingers. Just beyond the opening 3, see Fig. 2, I provide a serrated opening 8 which constitutes a continuation of the opening 3. This opening is formed by the toothed edges 9 of opposite spring scraper members 10, 11 preferably held in adjustment by fastenings 12 and capable of limited adjustment to vary the size of the opening 8 by means of slots 13. Any other means of adjustment may be provided and instead of having these members 10 and 11 themselves spring-like the desired yielding and pressure-giving function may be provided in any convenient manner. For facilitating the guiding of the filler piece 5 in its forward movement in the direction of the arrow 14 I bevel the spring members as indicated at 15. Beneath the container 1 is any suitable heating means, herein shown for convenience as an ordinary electric heater 16, to melt the contained filler material or other cementitious coating substance and keep it properly fluid for coating the pieces 5 as they are dipped and removed by the operator. Preferably also suitable heating means of any kind is employed for maintaining the engaging edges 9 of the scraper springs 10, 11 hot. They should be hotter than the cement in order to facilitate rapid and proper working of the apparatus. Otherwise they would tend to chill the cement when they engage the coating. As herein shown I maintain the scraper springs hot by carrying them around the container 1 and into the heater 16 and into direct contact connection at their lower ends with the heater 16 so that by conduction the heat from the latter is conveyed directly through the springs to their working edges 9. A cap 17 removably closes an opening for pouring in the material 2. It will be understood that the edges of the scrapers 10, 11 may be varied in shape to suit the preferences or requirements as to the ridging effect on the coating material of the piece 5 and that only one of said edges may be toothed in case it is preferred to have the filler piece smooth on one side. The shape of these edges will depend largely upon the character or kind of coating material and the latter will depend largely upon the kind of blank, center piece, or foundation or support being used for carrying the coating material. In case an extra thick material such as finely ground cork mixed with a sticky carrier or binder is employed, I provide means for compressing or condensing the coating layers on the filler piece. A large variety of mechanisms for accomplishing this object may be employed but for example I have herein shown depending and preferably yielding lips or shaping and pressing or molding members 18, 18, see Fig. 3. These members flare apart at their lower ends 20 so as to embrace a considerable mass of the sticky plastic filler material as it is raised therebetween by the filler piece 5. As the piece is raised the mass of filler material thereon is pressed and squeezed progressively by the inwardly and upwardly sloping walls 20 of the members 18, 18 until reduced to the desired final thickness by the engagement of said members 18, 18 therewith at their upper portions where they approach most closely together. When the members 10, 11 are spring-like their upward movement, under the pulling action of the piece 5 as the latter is drawn out across their scraper edges 9, 9, results in swinging the members 18, 18 so as to bring them closer together. As however they themselves are quite yielding the result is that this swinging movement simply causes them to bring more pressure upon the coatings on the opposite sides of the filler piece. Also it is desirable to keep the filler material or other plastic substance 2 continuously agitated so as to prevent settling of the heavier material thereof. Any suitable agitator may be used. Preferably I provide a plate agitator 27 supported by a spring 21 fast at its outer end 22 on a remote part of the container 1 and operated by a bar 23 in position to be engaged by the thumb of the operator when he depresses a blank 5 in the liquid. Said bar is rigidly mounted on posts 24 extending upward from the agitator 27 and the latter preferably has an opening 25 to aid in the agitating effect on the liquid when the agitator is depressed.

Having filled the container 1 with the cement and preferably with cement heavily loaded as stated with ground cork or other comminuted filler material or at least having filled the container with heavy, pasty, plastic, cementitious substance of the kind required for the filler piece, the operator takes a blank or plain untreated piece 5 and dips it into the container through the slot 3 as shown in Fig. 1 and then moves it forward in the direction of the arrow 14 and thence upward in the direction of the arrow 26 in the slot 8 between the toothed edges 9, 9 and pulls it out. The result is that the springs 10, 11 yield upwardly slightly as the piece is pulled into position between them and as the piece is pulled upward the teeth 9 scrape the coating layers into ridges removing or shifting the cementitious coating laminae into the form shown in Fig. 3. The spring pressure of the teeth causes the latter to press against the filler piece to condense or compact the cementitious layers into permanent ridges or heaps. If more pressure is desired the springs are adjusted toward each other. If extra thick pieces are being treated the springs are adjusted away from each other correspondingly. These springs 10, 11 and 18, 18 are intended to have the two-fold functions of packing or compressing the cement while heaping it up as shown and also of leaving more or less cement or filler material according to their adjustment and according to the shape of the teeth if any.

As the filler coatings or masses on the opposite sides of the central piece 5 are raised they are given a preliminary compression or positioning on the piece by the converging spring wings or presser members 18, 18 whose shape operates to condense the opposite layers of plastic cementitious material before it reaches the scrapers and ridge-forming members as just explained. Also as the operator presses the blank down into the plastic material through the opening 3 he at the same time forcibly lowers the agitator 27 by the engagement of his thumb on the bar 23 and as his thumb slides off from the bar in the direction of the arrow 14 and into position over the slot 8 said agitator 27 forcibly rises under the impulse of its spring 21. This constant up and down movement of the agitator 27 causes it to keep the materials 2 thoroughly mixed and in proper suspension.

This application is one of a series covering the complete invention which may be more fully apprehended in connection with the method application Ser. No. 228,588 and the article application Ser. No. 228,236.

What I claim is:

1. The herein described apparatus for treating shoe-bottom filler pieces, comprising a receptacle for holding a sluggishly plastic coating material for application to said pieces, and means for converting the coating into heaped deposits on the piece as the dipped piece is removed from the receptacle.

2. The herein described apparatus for treating shoe-bottom filler pieces, comprising a receptacle for holding a sluggishly plastic coating material for application to said pieces, and means for simultaneously spreading, scraping and heaping up in stripes the said material on the piece.

3. The herein described apparatus for treating shoe-bottom filler pieces with hot coating material, comprising a heated receptacle for holding a sluggishly plastic coating material, a scraper for engaging and shaping said coating on the piece, and means for heating the engaging portion of said scraper.

4. An apparatus for treating shoe-bottom filler pieces with coating material, comprising a covered receptacle for holding a sluggishly plastic coating material, the cover of said receptacle containing a slot for receiving the piece as it is being dipped in said material, and an adjacent serrated slot scraper for receiving the dipped piece and shaping the material on the sides of said piece in accordance with its serrations as the piece is being removed from the receptacle.

5. An apparatus for treating shoe-bottom filler pieces with coating material, comprising a covered receptacle for holding a sluggishly plastic coating material, the cover of said receptacle containing a dipping slot having its adjacent portion formed of heat insulating material to protect the operator's fingers as the filler piece is being dipped through said slot, and a spring scraper having a relatively narrow serrated slot opening from said dipping slot for receiving the dipped piece and regulating the coating thereon as said dipped piece is being removed from the receptacle.

6. An apparatus for treating shoe-bottom filler pieces with coating material, comprising a container adapted to hold the coating material, means for agitating said coating material to keep the same thoroughly mixed for application to the filler pieces and an actuator for said agitating means adapted and arranged to be operated by the hand of the operator upon dipping the filler pieces into the container.

7. Apparatus for treating shoe-bottom filler pieces, comprising a receptacle for holding a sluggishly plastic coating material for application to said pieces, stripping means arranged to strip the surplus coating material from the piece as the piece is removed from the receptacle, and means for compressing the coating material on the piece before the piece is acted on by the stripping means.

8. Apparatus for treating shoe-bottom filler pieces, comprising a receptacle for holding a sluggishly plastic coating material for application to said pieces, means for compressing the coating material on the piece and partially removing surplus material after the piece has received its coating, and serrated means for further stripping surplus material from the piece and converting the compressed coating into heaped deposits on the piece as the piece is removed from the receptacle.

9. Apparatus for treating shoe-bottom filler pieces with coating material, comprising a covered receptacle for holding a sluggishly plastic coating material, the cover of said receptacle containing a straight edged entrance slot for the insertion of the filler pieces and a serrated edged removal and stripping slot connected end to end with the entrance slot, permitting the pieces to be removed directly from the entrance slot into the removal slot without withdrawing the pieces from the receptacle, and adapted to convert the coating into heaped deposits and to strip surplus material from the dipped piece as the latter is removed from the receptacle.

Signed by me at Boston, Mass., this 13th day of October, 1927.

ANDREW THOMA.